United States Patent
Taka

[19]

[11] Patent Number: 5,918,081
[45] Date of Patent: *Jun. 29, 1999

[54] CAMERA AND FILM FEED APPARATUS

[75] Inventor: Hideo Taka, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/975,392

[22] Filed: Nov. 20, 1997

Related U.S. Application Data

[63] Continuation of application No. 08/801,488, Feb. 18, 1997, abandoned.

[30] Foreign Application Priority Data

Feb. 20, 1996 [JP] Japan .................................. 8-055414

[51] Int. Cl.⁶ .............................. G03B 1/00; G03B 17/24
[52] U.S. Cl. ......................... 396/269; 396/319; 396/406
[58] Field of Search .................................. 396/269, 319, 396/406

[56] References Cited

U.S. PATENT DOCUMENTS

| | | | |
|---|---|---|---|
| 5,184,161 | 2/1993 | Egawa | 396/319 |
| 5,625,850 | 4/1997 | Nishinou | 396/269 |
| 5,664,246 | 9/1997 | Ishihara et al. | 396/319 X |

*Primary Examiner*—W. B. Perkey
*Attorney, Agent, or Firm*—Robin, Blecker & Daley

[57] ABSTRACT

A film feed apparatus detects the feed speed of a film having one perforation formed in a leader, and two perforations respectively formed at positions corresponding to the leading and trailing ends of each photographing frame. The apparatus includes a driving source for feeding the film, a sensor for detecting the passage of the perforation when the film is fed, a time measuring circuit for measuring the time between the instant at which the sensor detects the passage of the first perforation positioned at the leader (or the leading end of the photographing frame) and the instant at which the sensor detects passage of the second perforation positioned at the leading end of the photographing frame (or the next photographing frame), and an arithmetic circuit for calculating the feed speed of the film on the basis of the measurement result obtained by the time measuring circuit.

48 Claims, 7 Drawing Sheets

CAMERA AND FILM FEED APPARATUS

This is a continuation application under 37 CFR 1.62 of prior application Ser. No. 08/801,488, filed Feb. 18, 1997 now abandoned.

BACKGROUND OF THE INVENTION

1. Field of the Invention

The present invention relates to a film feed apparatus for detecting the feed speed of a film having perforations, and a camera.

2. Related Background Art

A conventional method of recording data on a magnetic layer (magnetic recording portion) formed on a film will be described below with reference to FIG. 6.

Figure 6:
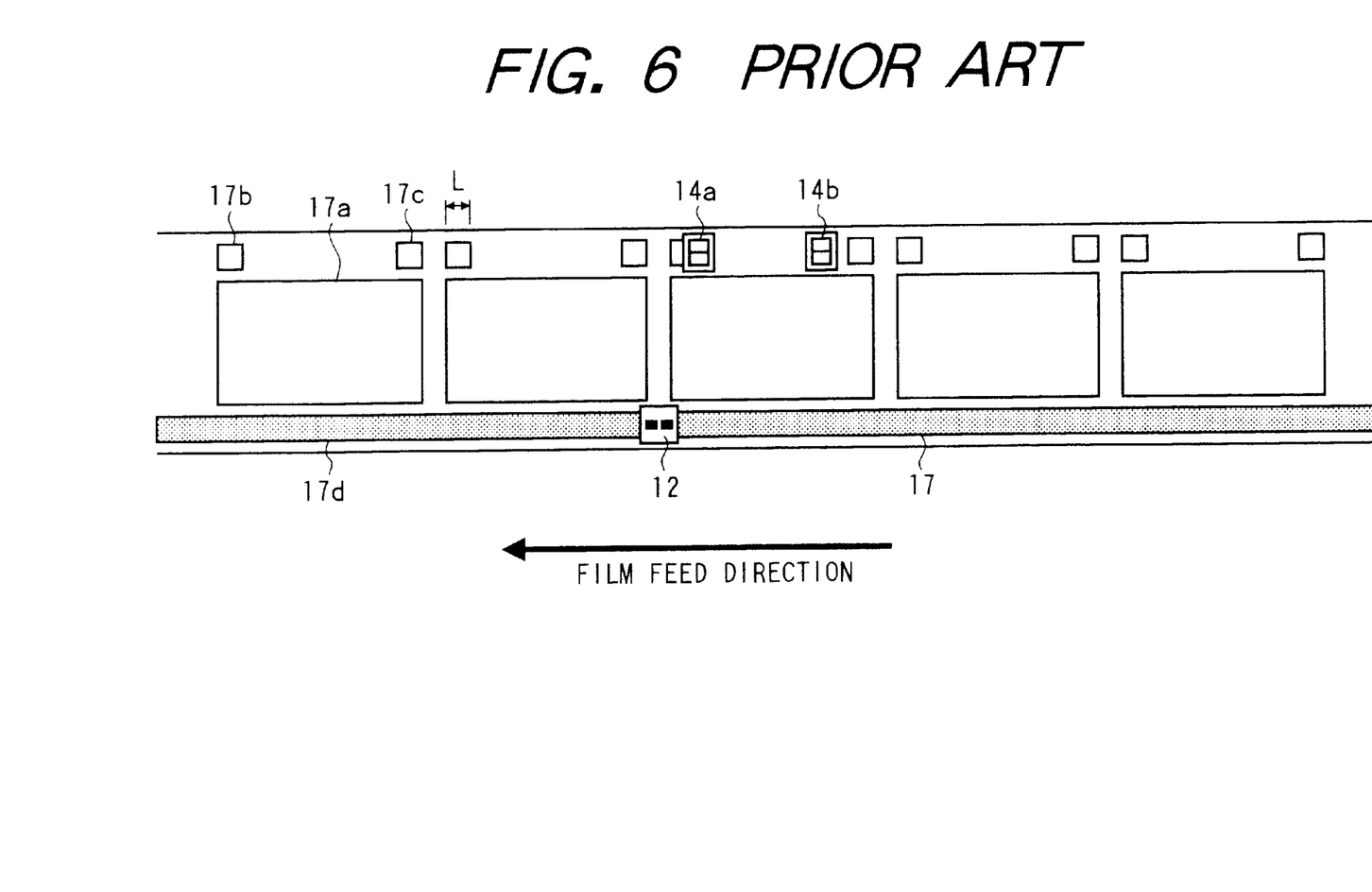
FIG. 6 is a plan view showing the positions of a film having a magnetic recording portion, a magnetic head, and photosensors.

Referring to FIG. 6, a film 17 has a magnetic recording portion 17d. This film also has perforations 17b, each indicating the start position of a corresponding exposure surface 17a, and perforations 17c, each indicating the end position of a corresponding exposure surface 17a. Photosensors 14a and 14b are used to detect the perforations 17b and 17c. A magnetic head 12 is positioned to oppose the magnetic recording portion 17d.

The magnetic head 12 is used to magnetically record photography information such as the date of photography, the print aspect ratio, and exposure information on the magnetic recording portion 17d during film feed. In this case, in order to properly perform a magnetic recording operation by detecting the moving speed of the film, a write frequency for magnetic recording is determined at the start of film feed.

Figure 7:
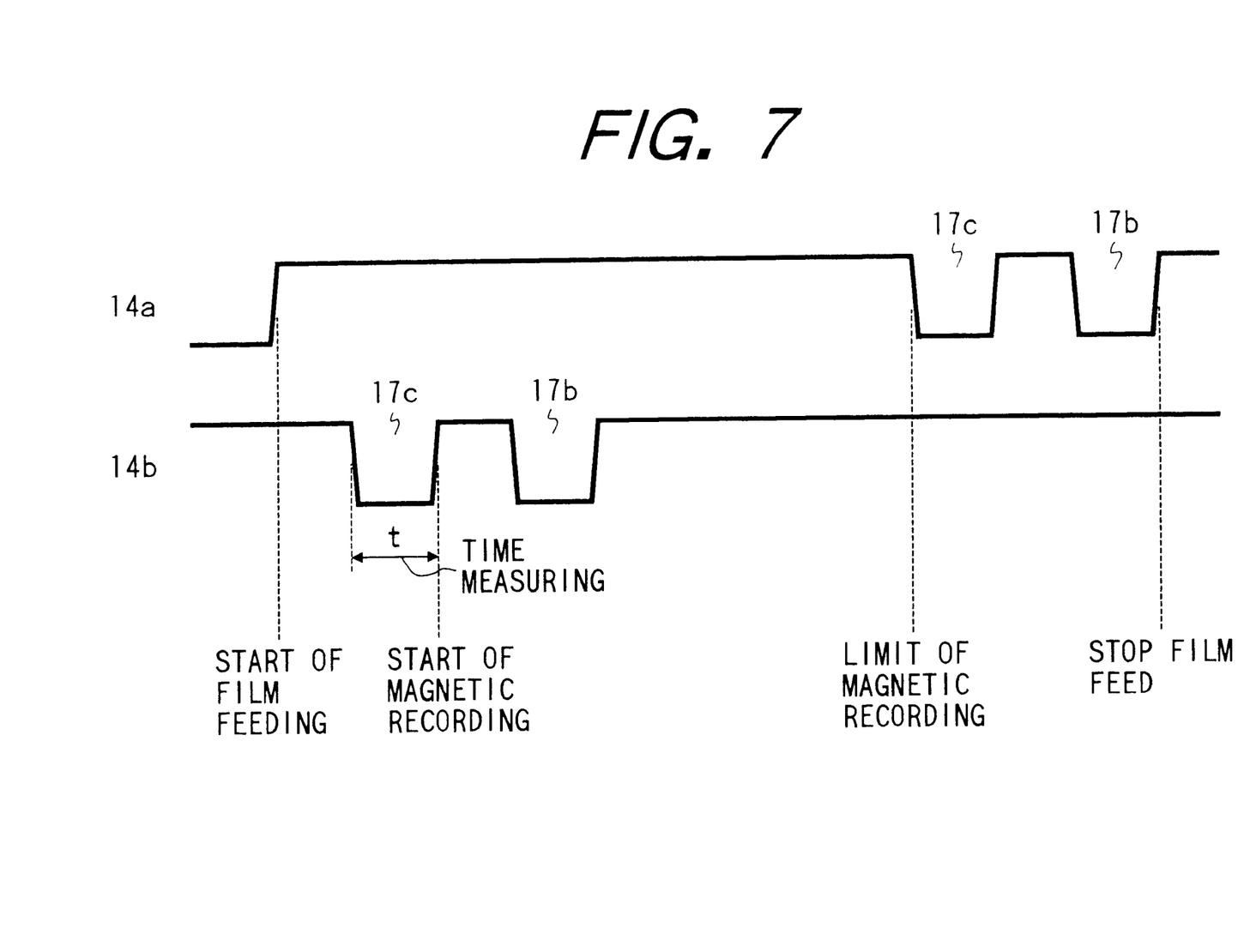
FIG. 7 is a timing chart showing outputs from the photosensors in FIG. 6 during one-frame feed.
Figure 8A:
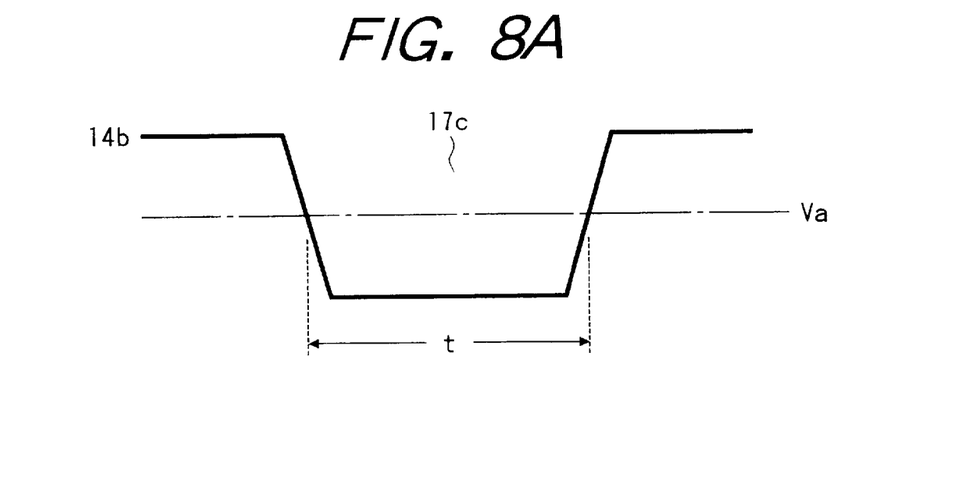
FIGS. 8A, 8B, and 8C are timing charts for explaining variations in perforations and measured times in the prior art.
Figure 8B:
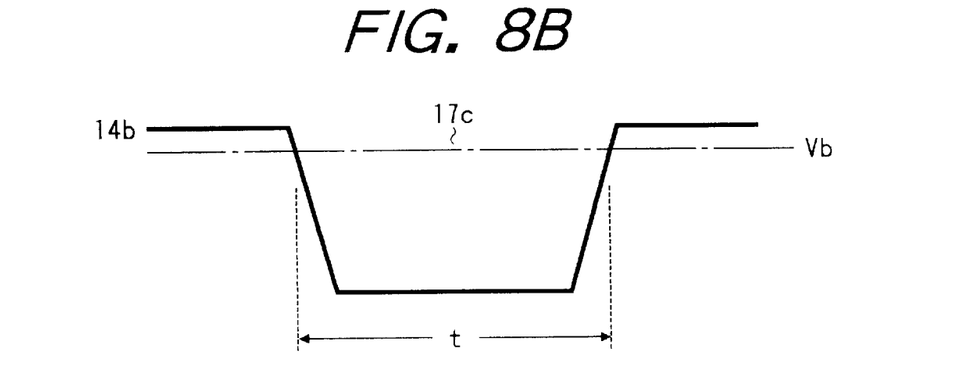
Figure 8C:
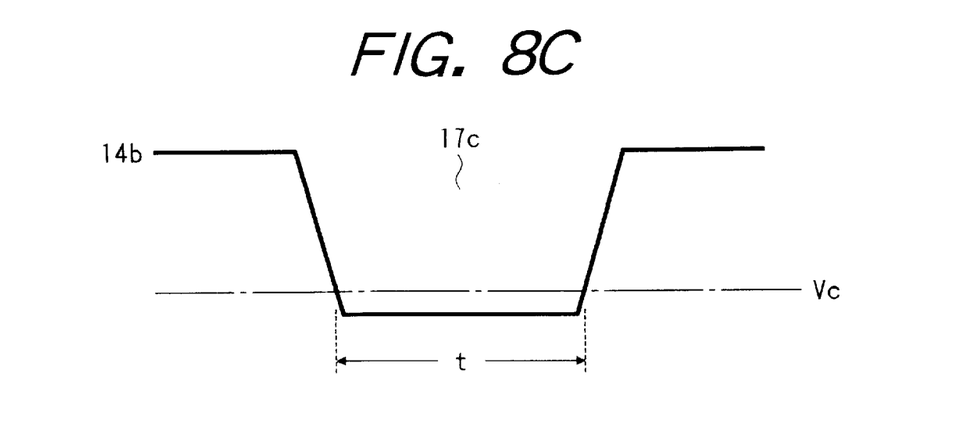

FIG. 7 is a timing chart of a one-frame film feed operation and a magnetic recording operation, showing the relationship between the perforations 17b and 17c detected by the photosensors 14a and 14b.

Referring to FIG. 7, when film feed is started, the perforation 17c is detected first by the photosensor 14b. The passing time of this detected perforation 17c is measured to detect the feed speed of the film. A proper write frequency for magnetic recording is determined from the detected feed speed, and a magnetic recording operation using the magnetic head 12 is started. The magnetic recording operation is terminated before the perforation 17c is detected by the photosensor 14a, and film feed is stopped at the end of detection of the perforation 17b.

Letting L be the length of each perforation, and t be the passing time of the perforation 17c which is detected and measured by the photosensor 14b, a feed speed v is given by:

$$v = L/t$$

Letting D be the recording density indicating the number of data written on the magnetic recording portion 17d per unit length, a magnetic recording frequency f is given by:

$$f = D \times v$$
$$= D \times (L/t)$$

SUMMARY OF THE INVENTION

According to one aspect of this invention, there is provided a film feed apparatus for detecting a feed speed of a film having one perforation formed in a leader, and two perforations respectively formed at positions corresponding to the leading and trailing ends of each photographing frame, comprising a driving source for feeding the film, a sensor for detecting passage of the perforation when the film is fed, a time measuring circuit for measuring a time between the instant at which the sensor detects passage of a first perforation positioned at the leader and the instant at which the sensor detects passage of a second perforation positioned at the leading end of the photographing frame, and an arithmetic circuit for calculating the feed speed of the film on the basis of the measurement result obtained by the time measuring circuit. With this arrangement, even if the determination reference for the sensor varies, the feed speed of the film can be accurately detected.

According to the other aspect of this invention, there is provided a film feed apparatus for detecting a feed speed of a film having one perforation formed in a leader, and two perforations respectively formed at positions corresponding to the leading and trailing ends of each photographing frame, comprising a driving source for feeding the film, a sensor for detecting passage of the perforation when the film is fed, a time measuring circuit for measuring a time between the instant at which the sensor detects passage of a first perforation positioned at the trailing end of the photographing frame and the instant at which the sensor detects passage of a second perforation positioned at the leading end of a next photographing frame, and an arithmetic circuit for calculating the feed speed of the film on the basis of the measurement result obtained by the time measuring circuit.

DESCRIPTION OF THE PREFERRED EMBODIMENTS

An embodiment of the present invention will be described in detail below with reference to the accompanying drawings.

Figure 1:
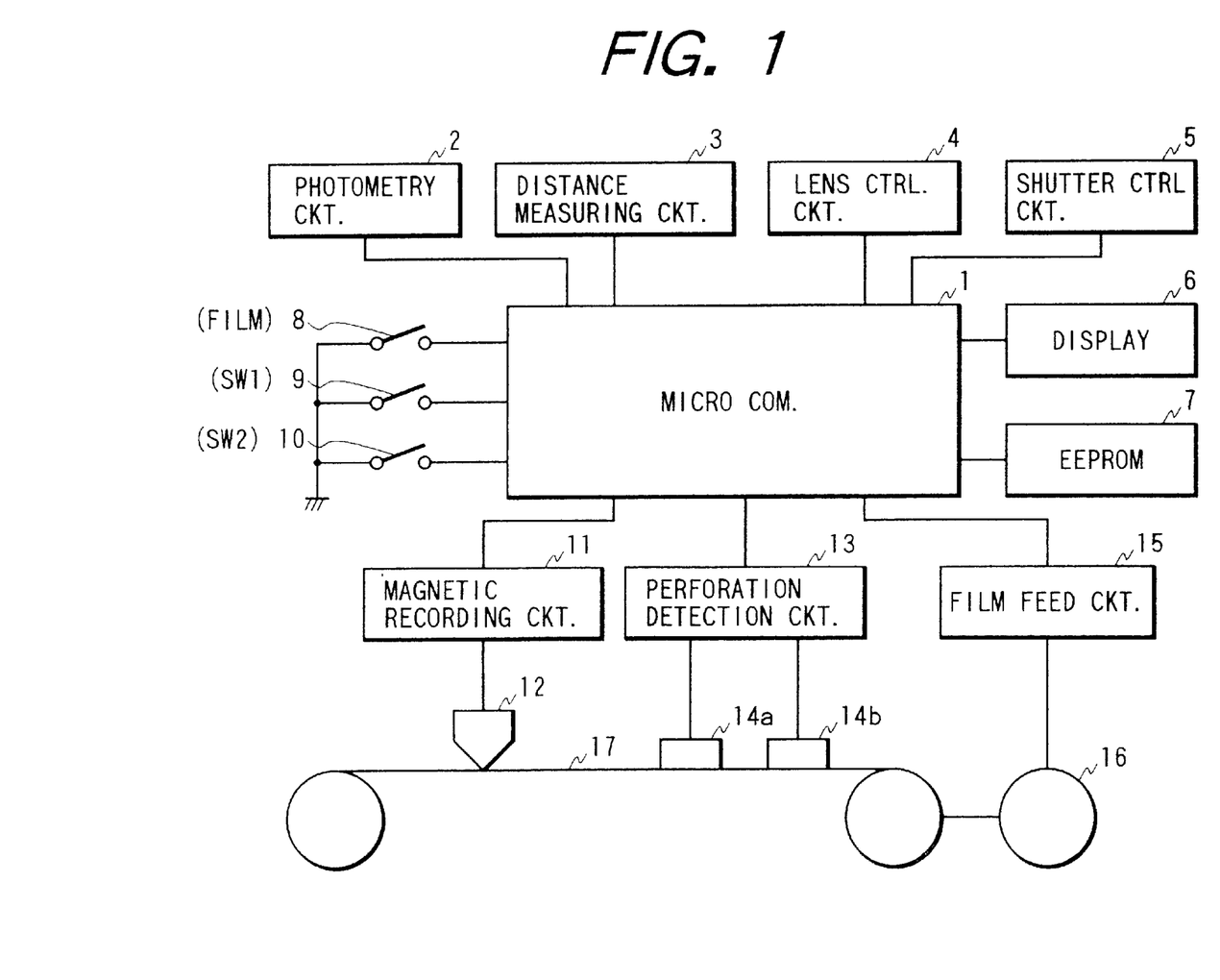
FIG. 1 is a block diagram showing the arrangement of a camera according to an embodiment of the present invention.

FIG. 1 is a block diagram showing a camera as a magnetic recording apparatus using a film having a magnetic recording portion according to an embodiment of the present invention.

Referring to FIG. 1, a microcomputer 1 controls the overall camera. A photometry circuit 2 performs photometry to determine an exposure amount of light. A distance measuring circuit 3 performs distance measurement to determine an object distance. A lens control circuit 4 adjusts the focus of a photographing lens in accordance with the distance determined by the distance measuring circuit 3. A shutter control circuit 5 provides the exposure amount of light determined by the photometry circuit 2 for the film. A display 6 is used to display information such as the number of frames. An EEPROM 7 serves as a nonvolatile memory which stores various data.

This apparatus also includes a film loading switch (FILM) 8, a first release stroke switch (SW1) 9 for starting photometry or distance measurement, a second release stroke switch (SW2) 10 for starting a release operation, a magnetic recording circuit 11 for recording photography information, a magnetic head 12 for magnetically recording information on a film, a perforation detection circuit 13 for detecting perforations of a film, photosensors 14a and 14b, each of which is constituted by, e.g., a photocoupler consisting of a light-emitting element and a light-receiving element and designed to receive light reflected by a film, a film feed circuit 15 for controlling a film feed motor, a film feed motor 16 for feeding a film, and a film 17 having a magnetic recording portion.

In this case, the magnetic head 12 and the photosensors 14a and 14b are positioned with respect to the film 17 in the same manner as in the arrangement shown in FIG. 6 according to the prior art.

Figure 2:
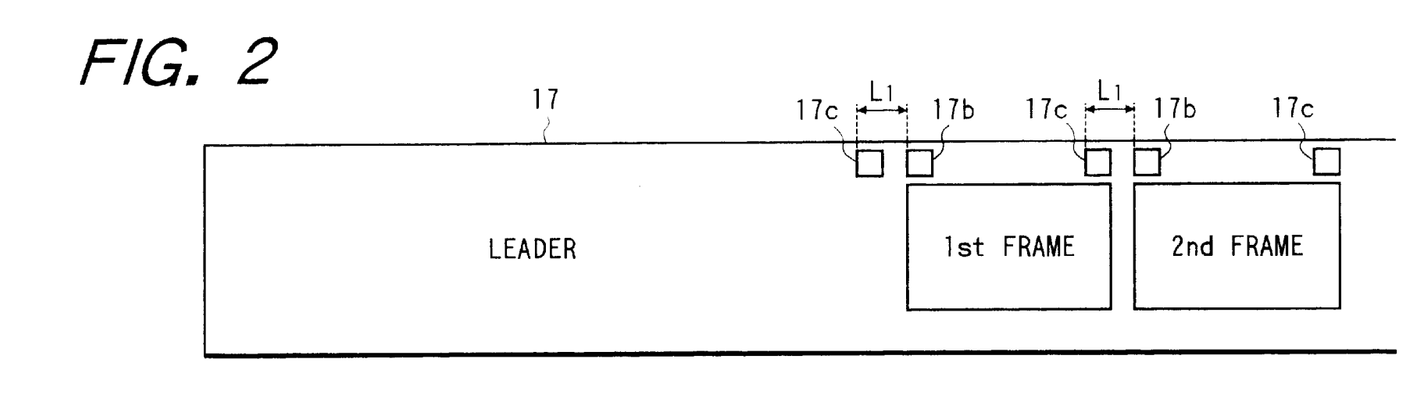
FIG. 2 is a plan view showing the positions of the leader and first and second frames of a film, together with perforations.

FIG. 2 shows the relationship between the positions of the leader and first and second frames of the film 17 and perforations. Assume that the interval between two adjacent perforations (the distance from one end of the perforation 17c to one end of the perforation 17b) is represented by $L_1$. The perforation interval $L_1$ is a standardized value. The camera stores information corresponding to this value.

Figure 3:
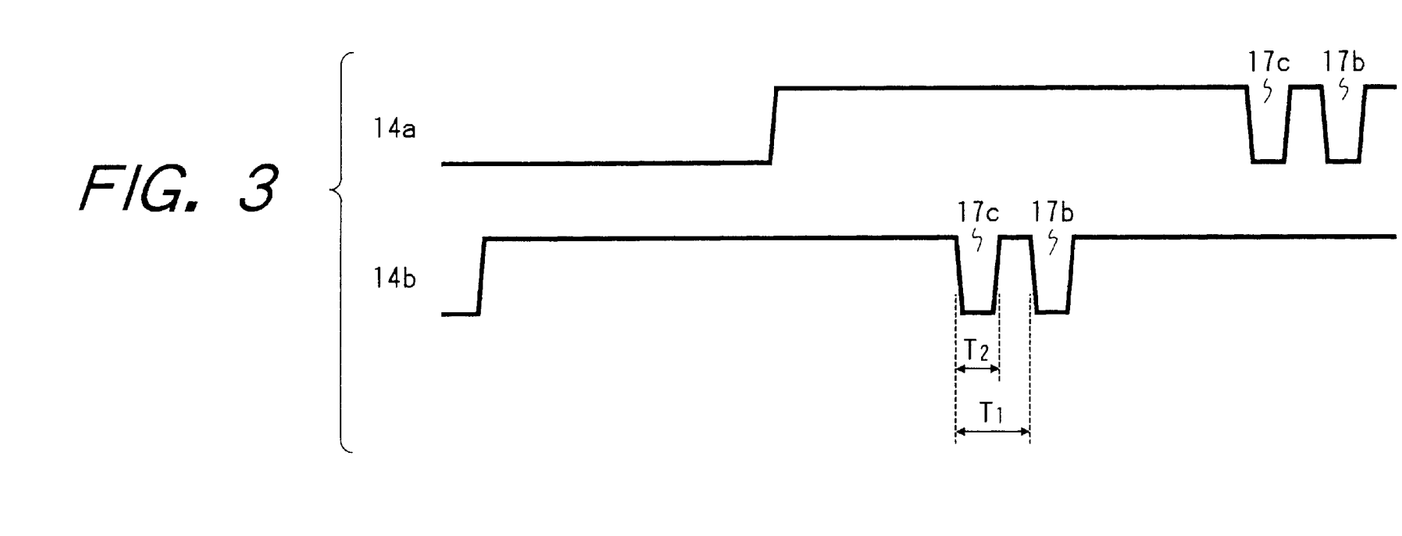
FIG. 3 is a timing chart showing outputs from the photosensors in FIG. 1 during film leader feed.

FIG. 3 shows outputs from the photosensors 14a and 14b which are obtained when the film 17 is fed by one frame after film loading.

As shown in FIG. 3, the leader of the film 17 passes through the photosensor 14b first, and then passes through the photosensor 14a. Thereafter, the perforations 17c and 17b sequentially pass through the photosensors 14a and 14b.

Let $T_1$ be the passing time corresponding to the interval $L_1$ between two perforations, and $T_2$ be the passing time corresponding to the distance from one end to the other end of the perforation 17c (the length of the perforation 17c).

Figure 4:
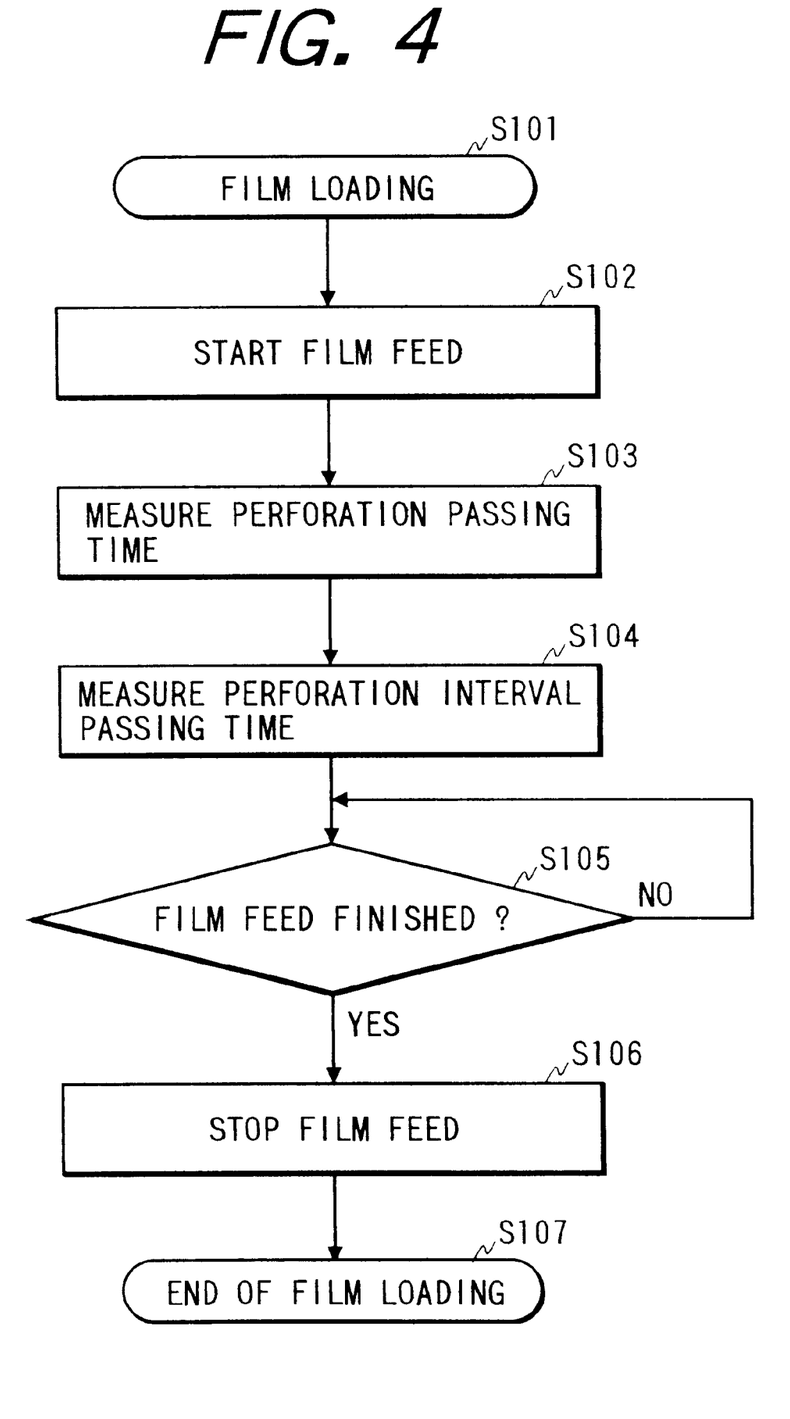
FIG. 4 is a flow chart showing the operation of the camera in FIG. 1 during film loading/feed.

FIG. 4 is a flow chart showing the operation of the microcomputer 1 upon detection of film loading through the film loading switch FILM in FIG. 1.

When the microcomputer 1 detects loading of the film 17, the flow advances from step S101 to step S102 to causes the film feed circuit 15 to start the film feed motor 16. As a result, the leader of the film 17 passes through the photosensors 14b and 14a first, and the perforation 17c then passes through the photosensor 14b. This passing time $T_2$ is measured as a perforation passing time in step S103. In step S104, the time $T_1$ between the instant at which the perforation 17c is detected by the photosensor 14b and the instant at which the perforation 17b is detected by the photosensor 14b is measured as a perforation interval passing time (the time interval between detection of the perforation 17c and detection of the perforation 17b).

Step S105 is repeated until the perforation 17b is detected by the photosensor 14a. In step S106, film feed is stopped. In step S107, the film loading operation is terminated.

Figure 5A:
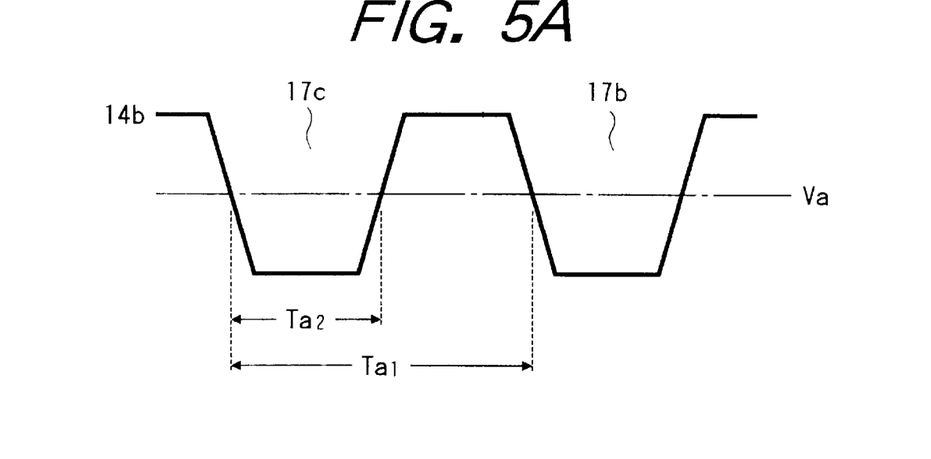
FIGS. 5A to 5C are timing charts for explaining variations in perforations and measured times in the embodiment.
Figure 5B:
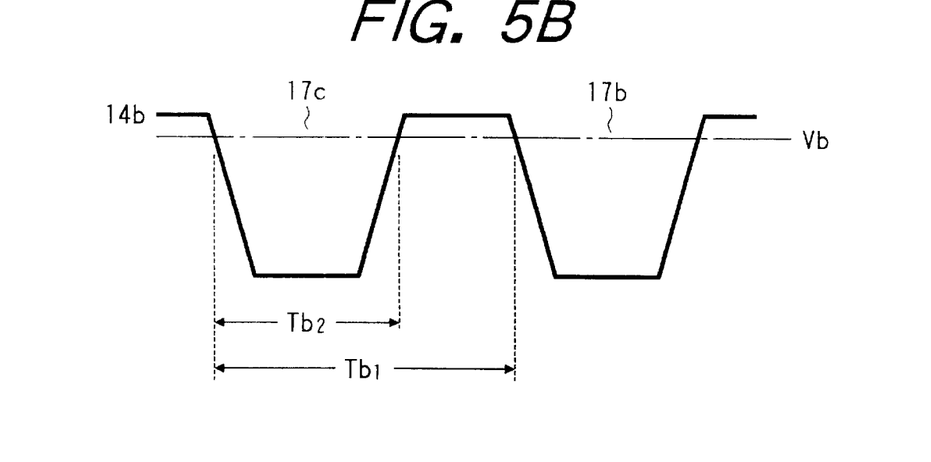
Figure 5C:
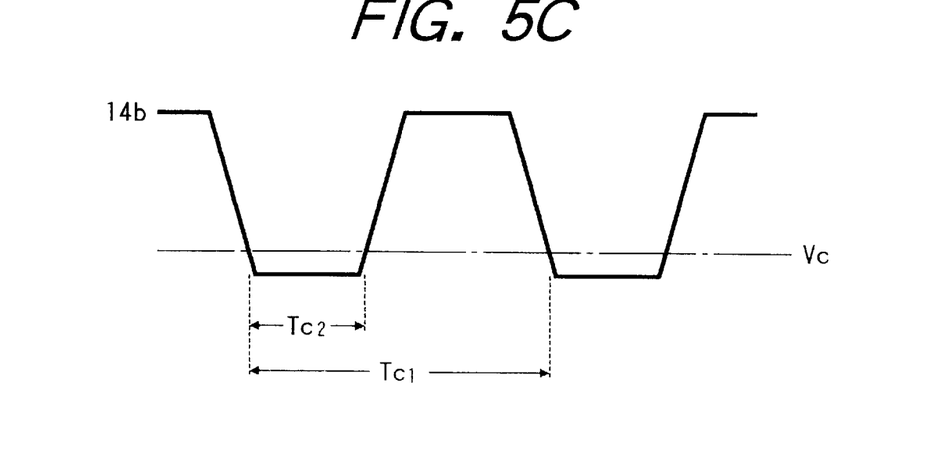

FIGS. 5A to 5C show the perforation interval passing time $T_1$ ($T_{a1}$, $T_{b1}$, and $T_{c1}$) and the perforation passing time $T_2$ ($T_{a2}$, $T_{b2}$, and $T_{c2}$) measured when the density determination level varies with respect to the magnitude of an output from the photosensor 14b because of variations in output from the perforation detection circuit 13, variations in output due to the type of a film, or the like.

As is apparent, the perforation passing time $T_2$ ($T_{a2}$, $T_{b2}$, and $T_{c2}$) greatly changes, but the perforation interval passing time $T_1$ ($T_{a1}$, $T_{b1}$, and $T_{c1}$) does not change. For this reason, the perforation passing time $T_1$ is used as a reference time.

Letting $L_2$ be the apparent length of each perforation which is detected with a change in the perforation passing time $T_2$, although the actual length of each perforation does not change, $$L_2 = L_1 \times (T_2/T_1) \tag{1}$$

FIG. 7 shows the outputs from the photosensors 14a and 14b which are obtained while the film is fed in units of frames, together with the control timing, as described above. Referring to FIG. 7, a passing time t of the perforation 17c is determined by the photosensor 14b after film feed is started. A feed speed v is detected on the basis of the time t. Since the feed speed v is given by $$v = L_2/t \tag{2}$$

a substitution of equation (1) into equation (2) yields $$v = (L_1/t) \times (T_2/T_1) \tag{3}$$

With this operation, the feed speed of the film can be accurately detected upon correction without being influenced by variations in output from the perforation detection circuit 13 or variations in output due to the type of a film.

A magnetic recording operation is started after the perforation 17c is detected by the photosensor 14b, and is terminated before the perforation 17c is detected by the photosensor 14a. Letting D be the recording density, a magnetic recording frequency f is given by $$f = D \times v \tag{4}$$

Therefore, a substitution of equation (3) into equation (4) yields $$f = D \times (L_1/t) \times (T_2/T_1) \tag{5}$$

With this operation, a magnetic recording operation can be accurately performed upon correction without being influenced by variations in output from the perforation detection circuit 13 or variations in output due to the type of a film.

According to this embodiment, a perforation passing time measured to actually detect a feed speed is corrected on the basis of the perforation passing time ($T_2$), and the perforation interval passing time ($T_1$), which are detected during film leader feed. Therefore, the feed speed can be accurately detected regardless of variations in output from the perforation detection circuit or variations in output from each photosensor due to the type of a film.

In addition, a perforation passing time measured to actually detect a feed speed is corrected on the basis of the perforation passing time ($T_2$), and the perforation interval passing time ($T_1$), which are detected during film leader feed, and a magnetic recording frequency corresponding to a recording density is obtained. Therefore, a magnetic recording operation can be accurately performed regardless of variations in output from the perforation detection circuit or variations in output from each photosensor due to the type of a film.

Modification

In the above embodiment, the film has two perforations per frame. However, the present invention can be equally applied to a case wherein a film has one or three or more perforations per frame.

In the above embodiment, the time interval ($T_{a2}$ in FIG. 5A) from the start of the perforation 17c to its end and the time interval ($T_{a1}$ in FIG. 5A) from the start of the perforation 17c to the start of the next perforation are detected to detect a feed speed. However, the present invention is not limited to this. For example, a feed speed may be detected by detecting the time interval ($T_{a2}$ in FIG. 5A) from the start of the perforation 17c to its end and the time interval from the end of the perforation 17c to the end of the next perforation. Alternatively, a feed speed may be detected by detecting the time interval from the start of a given perforation to its end and the time interval from the start (or end) of the given perforation to the start (or end) of the perforation spaced apart from the given perforation by one frame (or a plurality of frames).

Furthermore, in the above embodiment, a feed speed is detected by using a given perforation (e.g., the perforation 17c in FIG. 2) formed in the leader of a film, and a recording frequency for each frame is determined with the detected feed speed being set as a speed for the entire film. If, however, a feed speed is obtained for each frame by detecting a perforation passing time and the like for each frame, and a frequency for actually recording a signal is determined for each frame, a magnetic recording operation can be performed more accurately.

What is claimed is:

1. A film feed apparatus for detecting a feed speed of a film having one perforation formed in a leader, and two perforations respectively formed at positions corresponding to the leading and trailing ends of each photographing frame, comprising:
   a) a driving source for feeding said film;
   b) a sensor for detecting passage of said perforation when said film is fed;
   c) a time measuring circuit for measuring a time between the instant at which said sensor detects passage of a first perforation positioned at said leader and the instant at which said sensor detects passage of a second perforation positioned at the leading end of the photographing frame; and
   d) an arithmetic circuit for calculating the feed speed of said film on the basis of the measurement result obtained by said time measuring circuit.

2. An apparatus according to claim 1, wherein said sensor is a photosensor constituted by a light-emitting element and a light-receiving element, and detects passage of said perforation on the basis of a change in the amount of light received by said light-receiving element.

3. An apparatus according to claim 1, wherein said arithmetic circuit stores information about a distance from one end of said first perforation to one end of said second perforation in advance, and calculates the feed speed of said film on the basis of said information and the measurement result obtained by said time measuring circuit.

4. An apparatus according to claim 1, further comprising a magnetic recording circuit for writing magnetic information on said film, said magnetic recording circuit changing a magnetic recording frequency in accordance with the feed speed of said film.

5. A film feed apparatus for detecting a feed speed of a film having one perforation formed in a leader, and two perforations respectively formed at positions corresponding to the leading and trailing ends of each photographing frame, comprising:
   a) a driving source for feeding said film;
   b) a sensor for detecting passage of said perforation when said film is fed;
   c) a time measuring circuit for measuring a time between the instant at which said sensor detects passage of a first perforation positioned at the trailing end of the photographing frame and the instant at which said sensor detects passage of a second perforation positioned at the leading end of a next photographing frame; and
   d) an arithmetic circuit for calculating the feed speed of said film on the basis of the measurement result obtained by said time measuring circuit.

6. An apparatus according to claim 5, wherein said sensor is a photosensor constituted by a light-emitting element and a light-receiving element, and detects passage of said perforation on the basis of a change in the amount of light received by said light-receiving element.

7. An apparatus according to claim 5, wherein said arithmetic circuit stores information about a distance from one end of said first perforation to one end of said second perforation in advance, and calculates the feed speed of said film on the basis of said information and the measurement result obtained by said time measuring circuit.

8. An apparatus according to claim 5, further comprising a magnetic recording circuit for writing magnetic information on said film, said magnetic recording circuit changing a magnetic recording frequency in accordance with the feed speed of said film.

9. A film feed apparatus for detecting a feed speed of a film having one perforation formed in a leader, and two perforations respectively formed at positions corresponding to the leading and trailing ends of each photographing frame, comprising:
   a) a driving source for feeding said film;
   b) a sensor for detecting passage of said perforation when said film is fed;
   c) a time measuring circuit for measuring a time ($T_2$) required for said sensor to pass through a first perforation positioned at said leader;
   d) an arithmetic circuit for calculating the feed speed of said film on the basis of the measurement result obtained by said time measuring circuit; and
   e) a correction circuit for causing said time measuring circuit to measure a time ($T_1$) between the instant at which said sensor detects passage of said first perforation and the instant at which said sensor detects passage of a second perforation positioned at the leading end of a photographing frame, and correcting the feed speed of said film, which is obtained by said arithmetic circuit, on the basis of a ratio of the time ($T_2$) required for the passage of said first perforation to the time ($T_1$) between the instant at which the passage of said first perforation is detected and the instant at which the passage of said second perforation is detected.

10. An apparatus according to claim 9, wherein said sensor is a photosensor constituted by a light-emitting element and a light-receiving element, and detects passage of said perforation on the basis of a change in the amount of light received by said light-receiving element.

11. An apparatus according to claim 9, wherein said arithmetic circuit stores information about a distance from one end of said first perforation to one end of said second perforation in advance, and calculates the feed speed of said film on the basis of said information and the measurement result obtained by said time measuring circuit.

12. An apparatus according to claim 9, further comprising a magnetic recording circuit for writing magnetic information on said film, said magnetic recording circuit changing a magnetic recording frequency in accordance with the feed speed of said film.

13. A film feed apparatus for detecting a feed speed of a film having one perforation formed in a leader, and two perforations respectively formed at positions corresponding to the leading and trailing ends of each photographing frame, comprising:

a) a driving source for feeding said film;
   b) a sensor for detecting passage of said perforation when said film is fed;
   c) a time measuring circuit for measuring a time ($T_2$) required for said sensor to pass through a first perforation positioned at the trailing end of the frame;
   d) an arithmetic circuit for calculating the feed speed of said film on the basis of the measurement result obtained by said time measuring circuit; and
   e) a correction circuit for causing said time measuring circuit to measure a time ($T_1$) between the instant at which said sensor detects passage of said first perforation and the instant at which said sensor detects passage of a second perforation positioned at the leading end of a next photographing frame, and correcting the feed speed of said film, which is obtained by said arithmetic circuit, on the basis of a ratio of the time ($T_2$) required for the passage of said first perforation to the time ($T_1$) between the instant at which the passage of said first perforation is detected and the instant at which the passage of said second perforation is detected.

14. An apparatus according to claim 13, wherein said sensor is a photosensor constituted by a light-emitting element and a light-receiving element, and detects passage of said perforation on the basis of a change in the amount of light received by said light-receiving element.

15. An apparatus according to claim 13, wherein said arithmetic circuit stores information about a distance from one end of said first perforation to one end of said second perforation in advance, and calculates the feed speed of said film on the basis of said information and the measurement result obtained by said time measuring circuit.

16. An apparatus according to claim 13, further comprising a magnetic recording circuit for writing magnetic information on said film, said magnetic recording circuit changing a magnetic recording frequency in accordance with the feed speed of said film.

17. A camera for recording magnetic information on a feed speed of a film having one perforation formed in a leader, and two perforations respectively formed at positions corresponding to the leading and trailing ends of each photographing frame, comprising:

a) a driving source for feeding said film;
   b) a sensor for detecting passage of said perforation when said film is fed;
   c) a time measuring circuit for measuring a time interval between the instant at which said sensor detects passage of a first perforation positioned at said leader and the instant at which said sensor detects passage of a second perforation positioned at the leading end of the photographing frame;
   d) an arithmetic circuit for calculating the feed speed of said film on the basis of the measurement result obtained by said time measuring circuit; and
   e) a magnetic recording device for determining a magnetic recording frequency on the basis of the feed speed of said film, which is calculated by said arithmetic circuit, and writing magnetic information on said film at the determined magnetic recording frequency.

18. A camera according to claim 17, wherein said sensor is a photosensor constituted by a light-emitting element and a light-receiving element, and detects passage of said perforation on the basis of a change in the amount of light received by said light-receiving element.

19. A camera according to claim 17, wherein said arithmetic circuit stores information about a distance from one end of said first perforation to one end of said second perforation in advance, and calculates the feed speed of said film on the basis of said information and the measurement result obtained by said time measuring circuit.

20. A camera for recording magnetic information on a feed speed of a film having one perforation formed in a leader, and two perforations respectively formed at positions corresponding to the leading and trailing ends of each photographing frame, comprising:

a) a driving source for feeding said film;
   b) a sensor for detecting passage of said perforation when said film is fed;
   c) a time measuring circuit for measuring a time interval between the instant at which said sensor detects passage of a first perforation positioned at the trailing end of the photographing frame and the instant at which said sensor detects passage of a second perforation positioned at the leading end of a next photographing frame;
   d) an arithmetic circuit for calculating the feed speed of said film on the basis of the measurement result obtained by said time measuring circuit; and
   e) a magnetic recording device for determining a magnetic recording frequency on the basis of the feed speed of said film, which is calculated by said arithmetic circuit, and writing magnetic information on said film at the determined magnetic recording frequency.

21. A camera according to claim 20, wherein said sensor is a photosensor constituted by a light-emitting element and a light-receiving element, and detects passage of said perforation on the basis of a change in the amount of light received by said light-receiving element.

22. A camera according to claim 20, wherein said arithmetic circuit stores information about a distance from one end of said first perforation to one end of said second perforation in advance, and calculates the feed speed of said film on the basis of said information and the measurement result obtained by said time measuring circuit.

23. A camera for detecting a feed speed of a film having one perforation formed in a leader, and two perforations respectively formed at positions corresponding to the leading and trailing ends of each photographing frame, comprising:

a) a driving source for feeding said film;
   b) a sensor for detecting passage of said perforation when said film is fed;
   c) a time measuring circuit for measuring a time ($T_2$) required for said sensor to pass through a first perforation positioned at said leader;
   d) an arithmetic circuit for calculating the feed speed of said film on the basis of the measurement result obtained by said time measuring circuit;
   e) a correction circuit for causing said time measuring circuit to measure a time ($T_1$) between the instant at which said sensor detects passage of said first perforation and the instant at which said sensor detects passage of a second perforation positioned at the leading end of a photographing frame, and correcting the feed speed of said film, which is obtained by said arithmetic circuit, on the basis of a ratio of the time ($T_2$) required for the passage of said first perforation to the time ($T_1$) between the instant at which the passage of said first perforation is detected and the instant at which the passage of said second perforation is detected; and f) a magnetic recording device for determining a magnetic recording frequency on the basis of the feed speed of said film, which is calculated by said arithmetic circuit, and writing magnetic information on said film at the determined magnetic recording frequency.

24. A camera according to claim 23, wherein said sensor is a photosensor constituted by a light-emitting element and a light-receiving element, and detects passage of said perforation on the basis of a change in the amount of light received by said light-receiving element.

25. A camera according to claim 23, wherein said arithmetic circuit stores information about a distance from one end of said first perforation to one end of said second perforation in advance, and calculates the feed speed of said film on the basis of said information and the measurement result obtained by said time measuring circuit.

26. A camera for detecting a feed speed of a film having one perforation formed in a leader, and two perforations respectively formed at positions corresponding to the leading and trailing ends of each photographing frame, comprising:

a) a driving source for feeding said film;

b) a sensor for detecting passage of said perforation when said film is fed;

c) a time measuring circuit for measuring a time ($T_2$) required for said sensor to pass through a first perforation positioned at the leading end of the photographing frame;

d) an arithmetic circuit for calculating the feed speed of said film on the basis of the measurement result obtained by said time measuring circuit;

e) a correction circuit for causing said time measuring circuit to measure a time ($T_1$) between the instant at which said sensor detects passage of said first perforation and the instant at which said sensor detects passage of a second perforation positioned at the leading end of a next photographing frame, and correcting the feed speed of said film, which is obtained by said arithmetic circuit, on the basis of a ratio of the time ($T_2$) required for the passage of said first perforation to the time ($T_1$) between the instant at which the passage of said first perforation is detected and the instant at which the passage of said second perforation is detected; and f) a magnetic recording device for determining a magnetic recording frequency on the basis of the feed speed of said film, which is calculated by said arithmetic circuit, and writing magnetic information on said film at the determined magnetic recording frequency.

27. A camera according to claim 26, wherein said sensor is a photosensor constituted by a light-emitting element and a light-receiving element, and detects passage of said perforation on the basis of a change in the amount of light received by said light-receiving element.

28. A camera according to claim 26, wherein said arithmetic circuit stores information about a distance from one end of said first perforation to one end of said second perforation in advance, and calculates the feed speed of said film on the basis of said information and the measurement result obtained by said time measuring circuit.

29. A film feed apparatus for detecting a feed speed of a film having one perforation formed in a leader, and two perforations respectively formed at positions corresponding to leading and trailing ends of each photographing frame, comprising:

a) a driving source for feeding said film;

b) a sensor for detecting passage of said perforation when said film is fed;

c) a time measuring circuit for measuring a time between an instant at which said sensor detects passage of a perforation and an instant at which said sensor detects passage of next perforation; and d) an arithmetic circuit for calculating the feed speed of said film on the basis of the measurement result obtained by said time measuring circuit.

30. A film feed apparatus according to claim 29, wherein said sensor is a photosensor constituted by a light-emitting element and a light-receiving element, and detects passage of said perforation on the basis of a change in the amount of light received by said light-receiving element.

31. A film feed apparatus according to claim 29, wherein said arithmetic circuit stores information about a distance from one end of said perforation to one end of said next perforation in advance, and calculates the feed speed of said film on the basis of said information and the measurement result obtained by said time measuring circuit.

32. A film feed apparatus according to claim 29, further comprising a magnetic recording circuit for writing magnetic information on said film, said magnetic recording circuit changing a magnetic recording frequency in accordance with the feed speed of said film.

33. A camera for recording magnetic information on a film having one perforation formed in a leader, and two perforations respectively formed at positions corresponding to leading and trailing ends of each photographing frame, comprising:

a) a driving source for feeding said film;

b) a sensor for detecting passage of said perforation when said film is fed;

c) a time measuring circuit for measuring a time between an instant at which said sensor detects passage of a perforation and an instant at which said sensor detects passage of next perforation;

d) an arithmetic circuit for calculating the feed speed of said film on the basis of the measurement result obtained by said time measuring circuit; and e) a magnetic recording circuit for writing magnetic information on said film with a magnetic recording frequency, said magnetic recording frequency being determined on the basis of the feed speed of said film calculated by said arithmetic circuit.

34. A camera according to claim 33, wherein said sensor is a photosensor constituted by a light-emitting element and a light-receiving element, and detects passage of said perforation on the basis of a change in the amount of light received by said light-receiving element.

35. A camera according to claim 33, wherein said arithmetic circuit stores information about a distance from one end of said perforation to one end of said next perforation in advance, and calculates the feed speed of said film on the basis of said information and the measurement result obtained by said time measuring circuit.

36. A camera for recording magnetic information on a film, comprising:

a) a driving source for feeding said film;

b) a sensor for detecting passage of a perforation when said film is fed;

c) a time measuring circuit for measuring a time between an instant at which said sensor detects passage of a perforation and an instant at which said sensor detects passage of next perforation;

d) an arithmetic circuit for calculating the feed speed of said film on the basis of the measurement result obtained by said time measuring circuit; and e) a magnetic recording circuit for writing magnetic information on said film with a magnetic recording frequency, said magnetic recording frequency being determined on the basis of the feed speed of said film calculated by said arithmetic circuit.

37. A camera according to claim 36, wherein said sensor is a photosensor constituted by a light-emitting element and a light-receiving element, and detects passage of said perforation on the basis of a change in the amount of light received by said light-receiving element.

38. A camera according to claim 36, wherein said arithmetic circuit stores information about a distance from one end of said perforation to one end of said next perforation in advance, and calculates the feed speed of said film on the basis of said information and the measurement result obtained by said time measuring circuit.

39. A film feed apparatus for detecting a feed speed of a film having one perforation formed in a leader, and two perforations respectively formed at positions corresponding to leading and trailing ends of each photographing frame, comprising:

a) a driving source for feeding said film;

b) a sensor for detecting passage of said perforation when said film is fed;

c) a time measuring circuit for measuring a time between an instant at which said sensor detects passage of one end of a perforation and an instant at which said sensor detects passage of one end of next perforation; and d) an arithmetic circuit for calculating the feed speed of said film on the basis of the measurement result obtained by said time measuring circuit.

40. A film feed apparatus according to claim 39, wherein said sensor is a photosensor constituted by a light-emitting element and a light-receiving element, and detects passage of said perforation on the basis of a change in the amount of light received by said light receiving element.

41. A film feed apparatus according to claim 39, wherein said arithmetic circuit stores information about a distance from one end of said perforation to one end of said next perforation in advance, and calculates the feed speed of said film on the basis of said information and the measurement result obtained by said time measuring circuit.

42. A film feed apparatus according to claim 39, further comprising a magnetic recording circuit for writing magnetic information on said film, said magnetic recording circuit changing a magnetic recording frequency in accordance with the feed speed of said film.

43. A camera for recording magnetic information on a film having one perforation formed in a leader, and two perforations respectively formed at positions corresponding to leading and trailing ends of each photographing frame, comprising:

a) a driving source for feeding said film;

b) a sensor for detecting passage of said perforation when said film is fed;

c) a time measuring circuit for measuring a time between an instant at which said sensor detects passage of one end of a perforation and an instant at which said sensor detects passage of one end of next perforation;

d) an arithmetic circuit for calculating the feed speed of said film on the basis of the measurement result obtained by said time measuring circuit; and e) a magnetic recording circuit for writing magnetic information on said film with a magnetic recording frequency, said magnetic recording frequency being determined on the basis of the feed speed of said film calculated by said arithmetic circuit.

44. A camera according to claim 43, wherein said sensor is a photosensor constituted by a light-emitting element and a light-receiving element, and detects passage of said perforation on the basis of a change in the amount of light received by said light-receiving element.

45. A camera according to claim 43, wherein said arithmetic circuit stores information about a distance from one end of said perforation to one end of said next perforation in advance, and calculates the feed speed of said film on the basis of said information and the measurement result obtained by said time measuring circuit.

46. A camera for recording magnetic information on a film, comprising:

a) a driving source for feeding said film;

b) a sensor for detecting passage of said perforation when said film is fed;

c) a time measuring circuit for measuring a time between an instant at which said sensor detects passage of one end of a perforation and an instant at which said sensor detects passage of one end of next perforation;

d) an arithmetic circuit for calculating the feed speed of said film on the basis of the measurement result obtained by said time measuring circuit; and e) a magnetic recording circuit for writing magnetic information on said film with a magnetic recording frequency, said magnetic recording frequency being determined on the basis of the feed speed of said film calculated by said arithmetic circuit.

47. A camera according to claim 46, wherein said sensor is a photosensor constituted by a light-emitting element and a light-receiving element, and detects passage of said perforation on the basis of a change in the amount of light received by said light-receiving element.

48. A camera according to claim 46, wherein said arithmetic circuit stores information about a distance from one end of said perforation to one end of said next perforation in advance, and calculates the feed speed of said film on the basis of said information and the measurement result obtained by said time measuring circuit.

* * * * *